United States Patent [19]

Bosse et al.

[11] 4,282,055

[45] Aug. 4, 1981

[54] APPARATUS FOR APPLYING ADHESIVE RIDER STRIPS TO THE FLATTENED END EDGES OF TUBE SECTIONS OR SACKS

[75] Inventors: Frank Bosse, Tecklenburg; Horst Zemella, Leeden, both of Fed. Rep. of Germany

[73] Assignee: Windmoller & Holscher, Lengerich, Fed. Rep. of Germany

[21] Appl. No.: 138,754

[22] Filed: Apr. 9, 1980

[30] Foreign Application Priority Data

Apr. 11, 1979 [DE] Fed. Rep. of Germany ....... 2914696

[51] Int. Cl.[3] ......................... B32B 3/04; B65B 61/18

[52] U.S. Cl. ...................................... 156/464; 53/137; 156/201; 156/216; 156/465; 156/468; 156/498; 156/499; 156/500; 156/510

[58] Field of Search ............... 156/196, 199, 200, 201, 156/202, 204, 214, 216, 227, 459, 461, 464, 465, 468, 475, 483, 498, 499, 500, 510; 53/137, 290, 296, 378, 379, 380, 415; 427/286

[56] References Cited

U.S. PATENT DOCUMENTS

| | | | |
|---|---|---|---|
| 2,213,157 | 8/1940 | Brenn | 156/202 |
| 2,749,966 | 6/1956 | Roetger | 156/201 |
| 3,173,232 | 3/1965 | Mercer | 53/137 |
| 3,527,631 | 9/1970 | Ryburn | 156/216 |

*Primary Examiner*—Caleb Weston
*Attorney, Agent, or Firm*—Fleit & Jacobson

[57] ABSTRACT

Apparatus for joining the aligned edges of superposed plies of sheet material by means of an adhesive joining strip comprises a retractable nozzle for applying adhesive to the strip, and a forming plate which is curved for guiding the strip towards said edges and which defines a channel for bending the strip into U shape so that the edges come to lie between the limbs of the U.

4 Claims, 4 Drawing Figures

FIG. 3
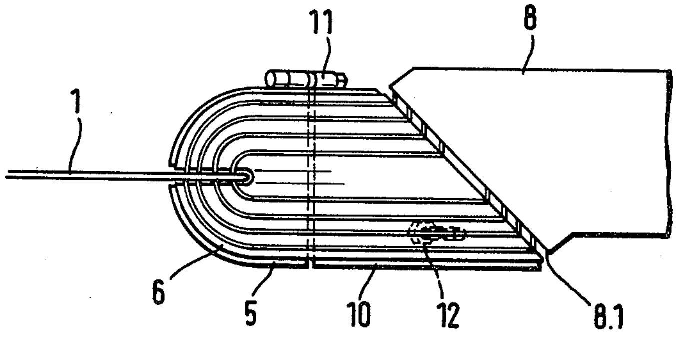
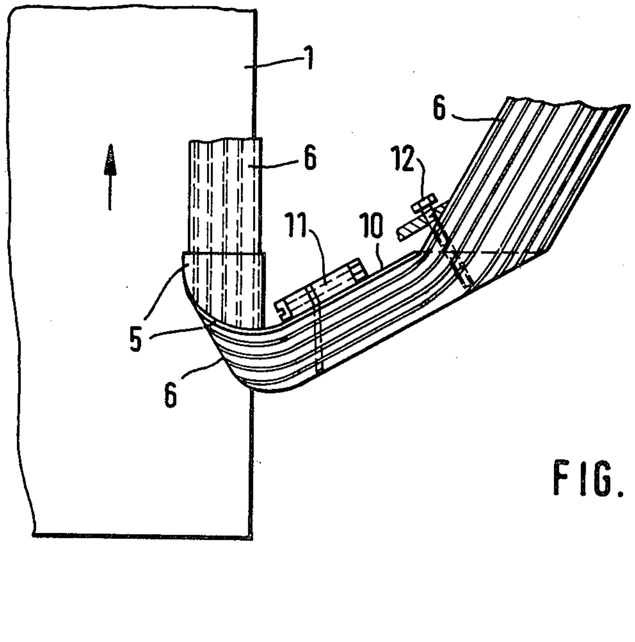
FIG. 4

APPARATUS FOR APPLYING ADHESIVE RIDER STRIPS TO THE FLATTENED END EDGES OF TUBE SECTIONS OR SACKS

The invention relates to an apparatus for applying adhesive rider strips to the flattened end edges of tube sections or sacks, comprising a curved forming plate over the convex outer side of which the rider strip-forming web is guided and which, starting from its rectilinear run-up edge up to the transverse apex line of the curvature, is increasingly curved about its axis lying in the direction of web travel and, behind the apex line up to its run-off edge, is increasingly oppositely curved into the shape of the rider strip framing the edge.

An apparatus of this kind known from U.S. Pat. No. 3,173,232 serves to apply rider strips to the flat superposed mouth edges of filled sacks for the purpose of closing same, the rider strips being formed from a web which is withdrawn from a supply reel and fed vertically from above. In order to provide the rider strips with an application of adhesive consisting of hot melt, the known apparatus is provided in the run-up zone of the forming plate with a hot melt applicator nozzle which provides the web with strips of hot melt before it is deformed to U shape. However, in the known apparatus disruptions can occur if the web forming the rider strips is stopped, for example in the absence of sacks that are to be closed. During such standstill periods, hot melt adhesive continues to flow from the nozzle and this solidifies and soils the apparatus. When the apparatus is restarted, it must therefore first be cleaned and a clean web must be led over the forming plate.

It is therefore the problem of the present invention to provide an apparatus of the aforementioned kind which can be stopped and started without the danger of sticking the soiling by the hot melt adhesive which leads to disruptions.

According to the invention, this problem is solved in that the groove of the forming plate that embraces the end edges and deforms the web to U shape is disposed in a substantially horizontal plane and the run-up edge is so inclined to the groove that it includes an acute angle with the upper side from its medial plane, and that the hot melt-applying adhesive nozzle is formed by a plate which is provided with a slot or bores, is disposed closely above and parallel to the web running up the oblique run-up edge, and is displaceable between its front operative position and a retracted inoperative position.

In the apparatus according to the invention, the adhesive applicator nozzle is displaceable transversely to the web which is subsequently formed into rider strips, so that, by means of a control which becomes effective when the apparatus is stopped, it can be displaced to its inoperative retracted position in which hot melt leaving the adhesive nozzle can for example drip into a trough without the danger of smearing and soiling the apparatus. When the apparatus is restarted, the adhesive nozzle is returned by a control device to its operative position in which it provides the rider strip-forming web with an application of hot melt adhesive. The adhesive nozzle is inclined to the horizontal so that the hot melt leaving the nozzle gap or bores cannot flow down the nozzle because there is for example no vertical wall to which the threads of hot melt might adhere. Instead, the hot melt threads or strips are free to leave the nozzles and drip without obstruction into a trough when the nozzle is disposed in its inoperative retracted position.

Desirably, the rear plate having the oblique run-up edge is separate from the forming plate and connected thereto by a hinge of which the pivotal axis is substantially parallel to the direction in which the web moves over the plate, a fixing screw being provided with which one can set the angle between the plate and the adjoining edge of the forming plate to set equally long limbs for the rider strip. By means of this construction it is simple to align the rider strip running onto the edges to be joined, so that it engages over the walls of the sack by equal distances.

To prevent premature cooling of the hot melt application, the plate as well as the forming plate may be heatable.

One example of the invention will now be described in more detail with reference to the drawing, wherein:

FIG. 3 is an enlarged elevation of the forming plate and the hot melt applicator nozzle viewed in the direction of the arrow X in FIG. 2, and FIG. 4 is a plan view of the parts shown in FIG. 3.

Figure 1:
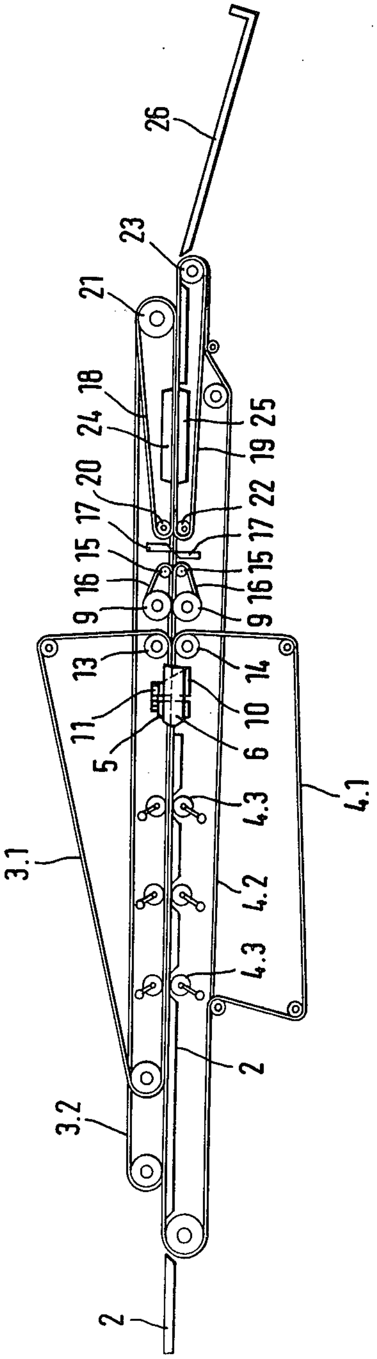
FIG. 1 is a diagrammatic side elevation of the apparatus for applying rider strips.
Figure 2:
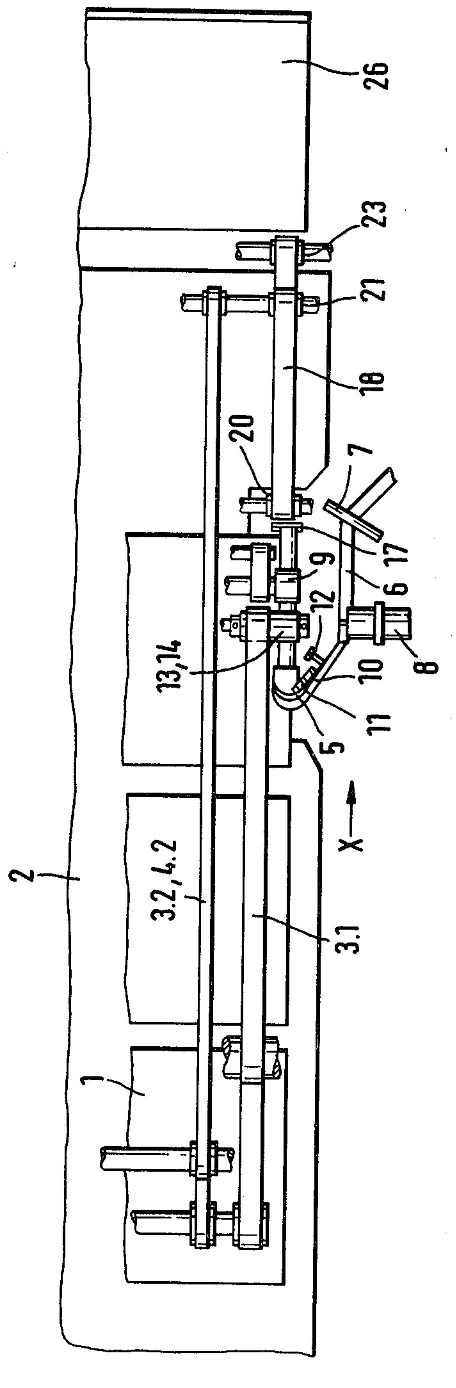
FIG. 2 is a fragmentary plan view of the FIG. 1 apparatus.

A flattened tube section 1 for a sack made from the tape fabric is placed on a table 2 and fed from the left-hand side by a belt guide consisting of upper belts 3.1 and 3.2 and lower belts 4.1 and 4.2. The upper runs of the lower belts 4 move on the table 2 and, by means of resiliently mounted rollers 4.3 provided for the apertures in the table 2, are pressed against the lower runs of the upper belts 3. At the edge of the table 1 or on the frame of the apparatus there is secured a deflecting and folding plate 5 over which the tube section 1 is provided with a rider strip 6. The rider strip 6 can likewise be made of tape fabric. It is unwound in flat form from a supply reel (not shown) and first fed along a predetermined distance substantially against the feeding direction of the tube sections 1 over a plurality of fixed guide rods of which only one is illustrated and designated 7. By means of the deflecting and folding plate 5, the rider strip 6 supplied as a flat strip is on the one hand diverted into the feeding direction for the tube sections 1 and directly thereafter folded to U shape about its longitudinal axis so that the arriving end of the tube section for the sack can enter the U fold. Upstream of the deflecting and folding plate 5 there is an extrusion nozzle 8 which applies a plurality of strips of liquefied thermoplastic adhesive to the rider strip 6 so that the adhesive strips point to the end of the tube section 1 after passing the deflecting edge of the folding plate 5 and thereby coming into contact with the outer edge faces of the tube section 1. Immediately behind the deflecting and folding plate 5 there are take-off rollers 9 for the rider strip 6 which on the one hand advance the rider strip 6 and on the other hand press the limbs of the rider strip against the end of the tube section whilst the adhesive is still in a fluent melted condition. The extrusion nozzle 8 comprises an end plate 8.1 with spaced bores through which the adhesive can be pressed when it is to be applied to the rider strip in the form of a plurality of strips.

The sack tube sections to be provided with rider strips are guided and conveyed horizontally in transverse position. The rider strip 6 and the end plate 8.1 are inclined by 45° to the vertical. This permits efficient application of adhesive and, when production is to be stopped, the extrusion nozzle 8 can be withdrawn from the rider strip 6 so that the adhesive can drip into a waste container, i.e. it need not also be stopped and nevertheless the rider strip will not become soiled.

Since the extrusion nozzle 8 is disposed some distance in front of the deflecting and folding plate 5 and there is a danger that the adhesive might become cool and no longer be tacky by the time the rider strip 6 is brought into contact with the sack tube section 1, a heated guide plate 10 in front of the deflecting and folding plate 5 is connected to the deflecting and folding plate 5 by a hinge 11 having a horizontal axis. The pivoted position of the guide plate 10 can be set by a screw 12 which turns in a fixed nut. By pivoting the guide plate 10, the lengths of the limbs of the rider strip can be set, i.e. the width of the downwardly folded portion and/or the upwardly folded portion of the rider strip.

The deflecting and folding plate 5 is heated in the same way as the guide plate 10 so that the rider strip 6 has heat supplied to it until it is applied to the sack tube section 1. Behind the deflecting and folding plate 5 there is a pair of cooling rollers 13, 14 which is traversed by cooling water in known manner. Adjoining the pair of cooling rollers 13, 14 there are pressure rollers 9 and pressure rollers 15 which, in the same way as the cooling rollers 13, 14, are pressed into each other by a resilient mounting. The belts 16 which support the pressing effect pass over the pressure rollers 9 and 15 which are disposed above and below the plane of movement of the sack tube sections 1.

A cutting tool 17 behind the pressure rollers 15 severs the rider strip between two passing sack tube sections 1. The cutting tool 17 is controlled in suitable manner, for example by photocells.

The severed sack tube section 1 provided with the rider strip is conveyed further by the conveyor belts 3.2 and 4.2. Behind the cutting tool 17 there are further conveyor belts 18, 19 which are directed towards the rider strip and run over direction-changing rollers 20 to 23. They serve, inter alia, to exert a pressure and cooling effect on the rider strip 6. For this purpose their runs touching the rider strip 6 are in contact with cooling boxes 24, 25 which are traversed by cooling water. The sack tube sections 6 with a now adequately cooled rider strip are deposited on a depositing plate 26 by the conveyor belts 18, 19.

We claim:

1. An apparatus for applying adhesive rider strips to the flattened end edges of tube sections or sacks, comprising a curved forming plate over the convex outer side of which the rider strip-forming web is guided and which, starting from its rectilinear run-up edge up to the transverse apex line of the curvature, is increasingly curved about its axis lying in the direction of web travel and, behind the apex line up to its run-off edge, is increasingly oppositely curved into the shape of the rider strip framing the edge, characterised in that the groove of the forming plate (5) that embraces the end edges and deforms the web to U shape is disposed in a substantially horizontal plane and the run-up edge is so inclined to the groove that it includes an acute angle with the upper side from its medial plane, and that the hot melt-applying adhesive nozzle (8) is formed by a plate (8.1) which is provided with a slot or bores, is disposed closely above and parallel to the web (6) running up the oblique run-up edge, and is displaceable between its front operative position and a retracted inoperative position.

2. Apparatus according to claim 1, characterised in that the rear plate (10) having the oblique run-up edge is separate from the forming plate (5) and connected thereto by a hinge (11) of which the pivotal axis is substantially parallel to the direction in which the web (6) moves over the plate (10), and that a fixing screw (12) is provided with which one can set the angle between the plate (10) and the adjoining edge of the forming plate (5) to set equally long limbs for the rider strip.

3. Apparatus according to claim 1 or claim 2, characterised in that the plate (10) and/or the forming plate (5) are heatable.

4. Apparatus according to one of claims 1 to 3, characterised in that the feed rollers (9, 15) compressing the rider strips (6) are disposed between the knives (17) severing the rider strips (6) and the forming plate (5).

* * * * *